(12) United States Patent
Patton et al.

(10) Patent No.: US 7,652,723 B1
(45) Date of Patent: Jan. 26, 2010

(54) COMPOSITE VIDEO SIGNAL CORRECTION UNIT FOR VIDEO IMAGING AND VIDEO RECORDING SYSTEMS

(75) Inventors: David Patton, Louisville, CO (US); Richard Frey, Louisville, CO (US); Edward Brannan, Erie, CO (US)

(73) Assignee: Video Accessory Corporation, Boulder, CO (US)

( * ) Notice: Subject to any disclaimer, the term of this patent is extended or adjusted under 35 U.S.C. 154(b) by 806 days.

(21) Appl. No.: 11/082,370

(22) Filed: Mar. 16, 2005

Related U.S. Application Data (60) Provisional application No. 60/563,751, filed on Apr. 19, 2004, provisional application No. 60/662,914, filed on Mar. 15, 2005.

(51) Int. Cl.
  *H04N 5/16* (2006.01)

(52) U.S. Cl. .............. 348/691; 348/692; 348/695; 348/525

(58) Field of Classification Search .............. 348/691, 348/692–698, 525, 521, 526–527, 689, 673, 348/677, 572
See application file for complete search history.

(56) References Cited

U.S. PATENT DOCUMENTS

| | | | |
|---|---|---|---|
| 4,215,371 A | 7/1980 | Baggett et al. | |
| 4,296,437 A | 10/1981 | Geurts | |
| 4,340,881 A | 7/1982 | Stack et al. | |
| 4,544,918 A | 10/1985 | De Haan | |
| 4,575,755 A | 3/1986 | Schoeneberger et al. | |
| 4,651,213 A | 3/1987 | Takimoto | |
| 4,680,633 A | 7/1987 | Gerdes et al. | |
| 4,719,584 A | 1/1988 | Rue et al. | |
| 4,849,906 A | 7/1989 | Chodos et al. | |
| 4,851,842 A | 7/1989 | Iwamatsu | |
| 4,853,792 A | 8/1989 | Katsuta et al. | |
| 4,982,191 A | 1/1991 | Ohta | |
| 5,012,330 A | 4/1991 | Bugni | |
| 5,057,932 A | 10/1991 | Lang | |
| 5,086,437 A | 2/1992 | Tomita | |
| 5,164,839 A | 11/1992 | Lang | |
| 5,218,449 A | 6/1993 | Ko et al. | |
| 5,276,517 A | 1/1994 | Matsuzawa et al. | |
| 5,280,356 A | 1/1994 | Hiramatsu | |
| 5,341,173 A | 8/1994 | Hyeon | |
| 5,422,804 A | 6/1995 | Clark | |
| 5,627,898 A | 5/1997 | Washino | |
| 5,644,263 A | 7/1997 | Clark | |

(Continued)

OTHER PUBLICATIONS

"Solutions for Genlocking," *VAC Sync Times*, Issue 1 (1995), 6 pages.

(Continued)

*Primary Examiner*—Trang U Tran
(74) *Attorney, Agent, or Firm*—Sheridan Ross P.C.

(57) ABSTRACT

In one embodiment, a signal processing system is provided that includes:
  (a) a video input 400 operable to receive a first analog video signal and remove the DC voltage offset component from the video signal to form a DC-adjusted analog video signal; and
  (b) DC restore circuitry 416 operable to set an average DC voltage of a first portion of the DC-adjusted analog video signal to a ground reference voltage to yield a DC-adjusted analog video signal. The DC-restored analog video signal is then provided to an Analog-to-Digital or A/D converter 112 for conversion into a digital video signal.

13 Claims, 8 Drawing Sheets

U.S. PATENT DOCUMENTS

| | | | |
|---|---|---|---|
| 5,659,313 | A | 8/1997 | Dischert et al. |
| 5,689,308 | A | 11/1997 | Nayebi |
| 5,798,802 | A | 8/1998 | Elmis et al. |
| 5,818,672 | A | 10/1998 | Hilbe |
| 5,867,222 | A | 2/1999 | Norris et al. |
| 5,892,555 | A | 4/1999 | Sohn |
| 5,952,945 | A | 9/1999 | Latham et al. |
| 5,986,719 | A | 11/1999 | Nakamura |
| 5,990,741 | A | 11/1999 | Yamamoto et al. |
| 5,995,157 | A | 11/1999 | Retter et al. |
| 5,995,166 | A | 11/1999 | Kawano |
| 5,995,705 | A | 11/1999 | Lang |
| 6,016,113 | A | 1/2000 | Binder |
| 6,107,887 | A | 8/2000 | Zucker et al. |
| 6,127,956 | A | 10/2000 | Agi |
| 6,147,633 | A | 11/2000 | Ukawa et al. |
| 6,160,443 | A | 12/2000 | Maalej et al. |
| 6,204,784 | B1 | 3/2001 | Hatfield |
| 6,268,814 | B1 | 7/2001 | Kolsrud |
| 6,288,658 | B1 | 9/2001 | Mestdagh et al. |
| 6,307,492 | B1 | 10/2001 | Berranger et al. |
| 6,317,473 | B1 | 11/2001 | Stott et al. |
| 6,320,627 | B1 | 11/2001 | Scott et al. |
| 6,320,917 | B1 | 11/2001 | Stott et al. |
| 6,326,911 | B1 | 12/2001 | Gomez et al. |
| 6,356,221 | B1 | 3/2002 | LeChevalier |
| 6,377,196 | B1 | 4/2002 | Kolsrud et al. |
| 6,417,794 | B1 | 7/2002 | Munoz et al. |
| 6,433,723 | B1 | 8/2002 | Randall |
| 6,459,447 | B1 | 10/2002 | Okada et al. |
| 6,459,458 | B1 | 10/2002 | Balaban |
| 6,492,924 | B2 | 12/2002 | Copley et al. |
| 6,509,796 | B2 | 1/2003 | Nguyen et al. |
| 6,515,542 | B1 | 2/2003 | Wang et al. |
| 6,515,600 | B2 | 2/2003 | Graen |
| 6,525,609 | B1 | 2/2003 | Behzad |
| 6,529,248 | B1 * | 3/2003 | Tsyrganovich .............. 348/691 |
| 6,556,158 | B2 | 4/2003 | Steensgaard-Madsen |
| 6,559,788 | B1 | 5/2003 | Murphy |
| 6,580,465 | B1 * | 6/2003 | Sato ........................... 348/689 |
| 6,584,365 | B1 | 6/2003 | Blanchard |
| 6,611,537 | B1 | 8/2003 | Edens et al. |
| 6,618,480 | B1 | 9/2003 | Polley et al. |
| 6,628,730 | B1 | 9/2003 | Stott et al. |
| 6,640,093 | B1 | 10/2003 | Wildhagen |
| 6,653,959 | B1 | 11/2003 | Song |
| 6,664,907 | B1 | 12/2003 | Knepper et al. |
| 6,665,308 | B1 | 12/2003 | Rakib et al. |
| 6,680,680 | B1 | 1/2004 | Mellot |
| 6,683,554 | B2 | 1/2004 | Nikai et al. |
| 6,684,065 | B2 | 1/2004 | Bult et al. |
| 6,690,311 | B2 | 2/2004 | Lundin et al. |
| 6,703,958 | B2 | 3/2004 | Noro |
| 6,704,673 | B2 | 3/2004 | McTigue |
| 6,734,817 | B2 | 5/2004 | Naka et al. |
| 6,738,002 | B2 | 5/2004 | Ercan et al. |
| 6,744,320 | B2 | 6/2004 | Nguyen et al. |
| 6,744,832 | B2 | 6/2004 | Miao |
| 6,759,904 | B2 | 7/2004 | Behzad |
| 6,788,230 | B2 | 9/2004 | Ahn |
| 6,795,496 | B1 | 9/2004 | Soma et al. |
| 6,798,286 | B2 | 9/2004 | Dauphinee et al. |
| 6,798,293 | B2 | 9/2004 | Casper et al. |
| 6,803,829 | B2 | 10/2004 | Duncan et al. |
| 6,816,096 | B2 | 11/2004 | Comer et al. |
| 6,816,204 | B2 | 11/2004 | Limberg |
| 6,822,601 | B1 | 11/2004 | Liu et al. |
| 6,831,576 | B2 | 12/2004 | Geiger et al. |
| 6,833,875 | B1 | 12/2004 | Yang et al. |

OTHER PUBLICATIONS

"Solutions for Ground Loop Interferences," *VAC Sync Times*, Issue 1 (1994), 4 pages.

Kramer Electronics, Ltd., "User Manual Model 104LN" (undated), pp. 1-5.

Kramer Electronics, Ltd., "User Manual Distribution Amplifiers Models VM-1010, VM1015, VM-1021, VM-1042, VM-1044, VN-1055, VM-54" (undated), pp. 1-22.

"The Electric Bullet—Newest Technology Topping the Security Dealer Chart," www.secdealer.com (Mar. 2003), p. 20.

Micronas Preliminary Data Sheet, "VPC 3205C, VPC 3215C, Video Processor Family," (Oct. 19, 1998), 6251-457-2PD, pp. 1-48.

Conexant Production Data Sheet, "CX25836/7 Video Decoder," 102267A (Sep. 2004), pp. 1-1-6-6.

VAC ProSeries Products, "1X4 Equalizing Distribution Amplifier, FlexPwr, for Belden 8281 Cable," Video Accessory Corporation (undated), 2 pages.

* cited by examiner

COMPOSITE VIDEO SIGNAL CORRECTION UNIT FOR VIDEO IMAGING AND VIDEO RECORDING SYSTEMS

CROSS REFERENCE TO RELATED APPLICATION

The present application claims the benefits of U.S. Provisional Application Serial Nos. 60/563,751, filed Apr. 19, 2004, and 60/662,914 filed Mar. 15, 2005, of the same title and to Patton, et al., each of which is incorporated herein by this reference.

FIELD OF THE INVENTION

The present invention relates generally to video imaging and video recording systems and specifically to video imaging and video recording systems including one or more analog composite video cameras or other video sources, and digital display, enhancement, or recording equipment that incorporates analog to digital conversion means.

BACKGROUND OF THE INVENTION

Video imaging systems are used in a broad variety of applications, including telecommunications, entertainment, security monitoring, and the like. Video imaging systems are generally placed in one of two categories, namely computer and television. In television applications, baseband video signals can follow a number of different formats, including the National Television Systems Committee or NTSC standard (the U.S. and Japan standard), the Phase Alternating Line or PAL standard (the European standard), and the High Definition/Standard Definition Digital Television format.

In television, there are three basic levels of baseband signal interfaces. In order of increasing quality, they are composite video (or Color, Video, Blanking, and Sync or CVBS), which uses one wire pair, Y/C (or S-video), which uses two wire pairs, and component, which uses three wire pairs. Each wire pair includes a signal and a ground. Composite signals are the most commonly used analog video interface and combine the brightness information (luma) and the color information (chroma) and the synchronizing signals on just one cable.

Figure 2:
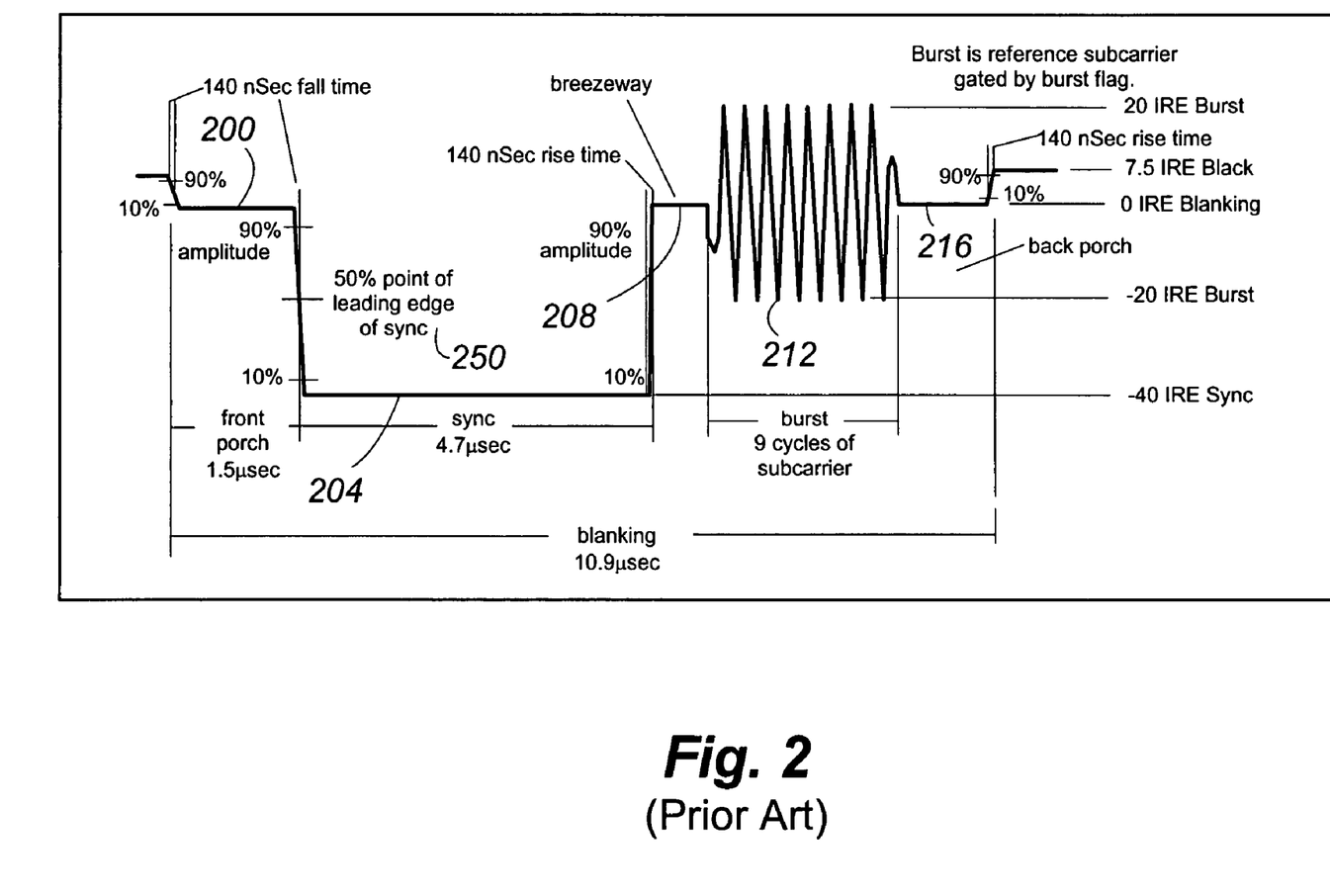
FIG. 2 depicts a video signal in accordance with the National Television Systems Committee or NTSC format.

FIG. 2 depicts the horizontal blanking portion of a typical NTSC composite video waveform that includes color information and represents one horizontal scan line. The signal includes a front porch 200 (which is the area of the signal between the end of the active video and the leading edge of a sync pulse), the sync pulse or tip 204, (which provides synchronizing timing information), a breezeway 208 (which is the area of the signal representing the time between the rising edge of the synch pulse 204 and the start of a color burst 212, the color burst 212 (or color subcarrier) (which is 8-10 cycles of the color reference frequency and is positioned between the rising edge of the sync pulse and the start of the active video), and the back porch 216 (which is the time between the end of the color burst and the start of active video).

In video imaging and video recording systems, analog composite video signals are often converted to a digital video signal for subsequent enhancement, display, and/or recording. While it is desirable that the analog composite video signal input to an analog-to-digital (A/D) converter fully meets the appropriate composite video standard (either the NTSC or PAL standards), in practice the composite video signal is often degraded and does not meet the desired standard due to some combination of low signal output from the video camera, signal loss, interference, or improper AC or DC signal levels. When the analog composite video signal fed to the A/D converter is degraded, the resulting digital video signal may be distorted. For example, the sync tip 204 may be disfigured. This distortion may be very slight or severe, depending on the type and level of degradation to the analog video signal.

The most common causes of composite video signal distortion in video imaging and video recording systems are as follows:

Signal loss in the transmission means. This loss may be due to attenuation, mismatched transmission lines, splitters or other passive devices within the transmission path.

Low output from the video source. If the signal output from the video camera or other source is not of sufficient amplitude, the video signal at the input to the A/D converter may not meet the desired standard even if the transmission line is virtually lossless.

Interference due to ground loops. Ground loops result when the ground potential is different between two components within a video system. This difference in ground potential can result in "hum bars" on the video picture caused by 60 Hz commercial power, or herringbone interference on the video picture caused by AM broadcast signals, or a combination of 60 Hz and AM broadcast interference that can result in hum bars, herringbone, blanking, color distortion, or other degradation to the video picture.

DC Offset. A DC voltage may be superimposed on the video signal by the video source or by another device within the signal path. If sufficiently large, the DC offset can result in physical damage to the A/D conversion means and/or to other components within the system. Even a small DC offset may not cause noticeable degradation to the video picture in an analog system but may cause errors in the A/D conversion process as described above. Many video components utilize AC coupling to eliminate DC offset, however, this approach results in the signal not having a fixed (e.g., DC) reference, which is critical to producing an analog composite video signal that fully meets the NTSC or PAL specifications.

Figure 1:
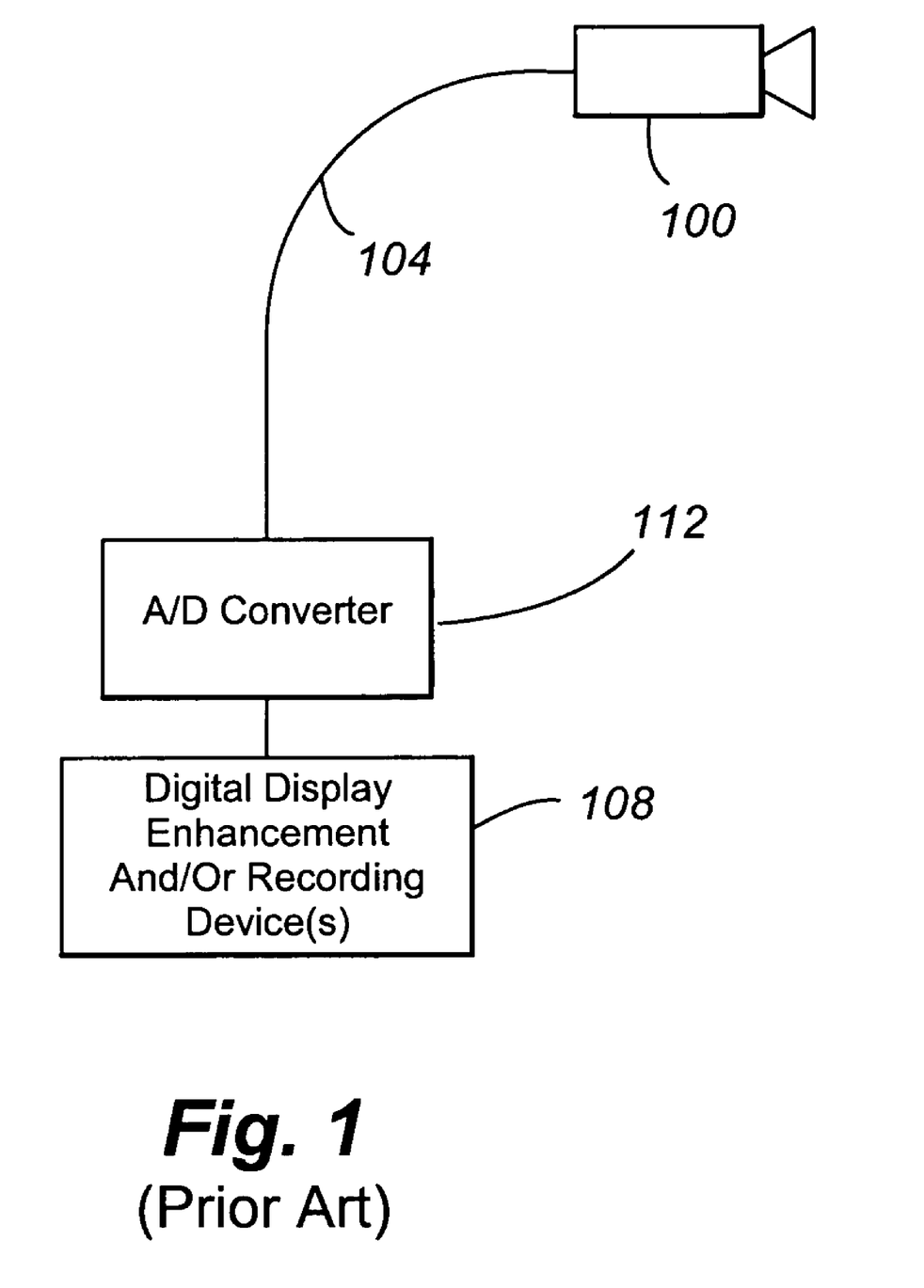
FIG. 1 is a block diagram of a video imaging system according to the prior art.

One exemplary application for the present invention is video security systems, such as that shown in FIG. 1. Such systems typically incorporate a multiplicity of video cameras 100 in continuous operation. The analog composite video signals from these cameras are transmitted via a transmission line 104 (e.g., coaxial cable, twisted pair, fiber optics, or radio being the most common transmission line) to a central location where the video signals may be monitored and are recorded. The video monitors and recorders 108 at the central location most commonly accept baseband composite video signals following either the NTSC format or the PAL format. Until recently, most video security systems utilized analog recorders. New systems and upgrades to existing video security systems typically incorporate one or more digital video recorders, or DVRs, that are designed to accept analog baseband video signals. A/D conversion circuitry 112, which is typically integrated within the DVR, is designed to work with either or both of the two signal standards (NTSC and PAL).

When the input video signal is even slightly degraded and does not meet the desired standard, the A/D conversion process may distort the digitized video signal, causing the resultant video picture to be significantly worse in terms of picture quality than would be the case with an analog video recorder. Whereas an analog video recorder might record a useable, though degraded, picture, the picture recorded by the DVR may be distorted to such an extent that much or all of the information is lost. Additionally many DVRs are designed to detect motion within the video picture based on an algorithm performed on the digitized video signal. If the digitized video signal is not an accurate and true representation of the video picture captured by the video camera, then the DVR algorithm may falsely detect motion when no motion is present, or conversely not detect motion when motion is actually present. In the first instance, the DVR will rapidly fill its available digital storage medium resulting in loss of data due to either insufficient storage capacity or earlier data being overwritten; in the second instance, the DVR will not record the desired data at all.

The common causes of video signal degradation within a video security system are well understood by video engineers and other experienced technical people. However, video security system installers typically have neither the necessary training to know the causes of video signal degradation, the needed test equipment (or training) to identify the specific cause of degradation in a video system installation, nor the knowledge to determine the most cost-effective solution even if the cause of a problem is identified. Additionally, in many installations the level of video signal degradation would be acceptable with an analog video recorder but results in severe picture degradation, continuous recording, or no recording, when a DVR is installed. There is currently no system able to simultaneously correct many of the common causes of video signal degradation within a video security system. With the increasing use of digital video recorders in video security systems, the need for such a solution is immediate and growing.

Another application for the present invention is video imaging systems. Analog composite video cameras are commonly used to capture video pictures that are converted to a digital video signal, then digitally manipulated or enhanced, displayed and/or recorded. Such applications, which include medical, satellite and airborne imaging systems, utilize an A/D conversion process as described above, and these systems may suffer from the same distortion effects described above if the analog video signal input is degraded. Since imaging systems typically require the highest possible picture resolution, any loss of intelligence due to degradation of the analog composite video system is highly undesirable.

Another application for the present invention is radar system displays. In many radar systems, the output from the radar receiver is a composite video signal. Many radar systems digitally enhance the displayed signal. Such systems utilize an A/D conversion process as described above, and these systems may suffer from the same distortion effects described above if the analog video signal input is degraded. Such display systems are utilized to produce the highest possible picture resolution, and the loss of intelligence due to degradation of the analog composite video system is highly undesirable.

SUMMARY OF THE INVENTION

These and other needs are addressed by the various embodiments and configurations of the present invention. The present invention is generally directed to a signal correction unit that removes noise and/or corrects various signal errors prior to conversion of the analog video signal into a digital video signal.

In one embodiment of the present invention, a signal processing method is provided that includes the steps of:

(a) receiving a first analog video signal that includes a fixed reference;

(b) removing the fixed reference (e.g., DC voltage offset component) from the video signal to form an adjusted analog video signal; and (c) setting an average voltage of a first portion of the adjusted analog video signal (the first portion can, for example, be one or more of the front porch, breezeway, color burst, and back porch) to a ground reference voltage to produce a restored video signal.

In one configuration, the restored video signal is converted into a digital video signal without the problems caused by unwanted DC offsets and loss of the DC reference voltage from the video signal. After removal of the DC offsets and before DC reference voltage restoration, the DC-adjusted analog video signal may further be passed through a differential input to remove ground loop interference.

To compensate for signal losses in the transmission line from the video source and low power output from the video source, the analog video signal, after being passed through the differential input may be further processed by adjustable gain and equalizer circuitry. The adjustable gain circuitry amplifies all components of the video signal equally while the equalizer circuitry amplifies only higher frequency components.

Applications for this embodiment of the present invention include, but are not limited to, security systems, video imaging, and radar display systems.

Until the present invention, there has been no single device that specifically corrects for the common causes of composite video signal degradation to ensure that the corrected analog video signal nearly meets, or most preferably fully meets, the desired composite video standard prior to an Analog-to-Digital or A/D conversion process where the resulting digital video signal is enhanced or otherwise digitally manipulated, displayed, and or recorded. The digital replica of the analog video signal can be relatively free of distortion, causing the resultant video picture to be of high quality and providing a high degree of accuracy in motion detection (as more accurate detection of pixel changes between frames). The analog-to-digital or A/D converter, due to the high standard of the analog video signal, can create fewer artifacts (noise) and the compression scheme can work more efficiently. As a result, the video file size can be reduced significantly. As will be appreciated, significant reductions in video file size equate to lower memory requirements, thereby avoiding the need for costly hard drives or limiting the time that the data can be stored. While the absolute resolution of the system is constrained by the camera resolution and the recording parameters of the Digital Video Recorder or DVR (which are typically user-defined), the resolution can also be impacted by the A/D conversion process. By providing a compliant video signal to the A/D converter, the resolution will not be adversely impacted by the digitization of the video signal.

These and other advantages will be apparent from the disclosure of the invention(s) contained herein.

As used herein, "at least one . . . and", "at least one . . . or", "one or more of . . . and", "one or more of . . . or", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, and A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 3:
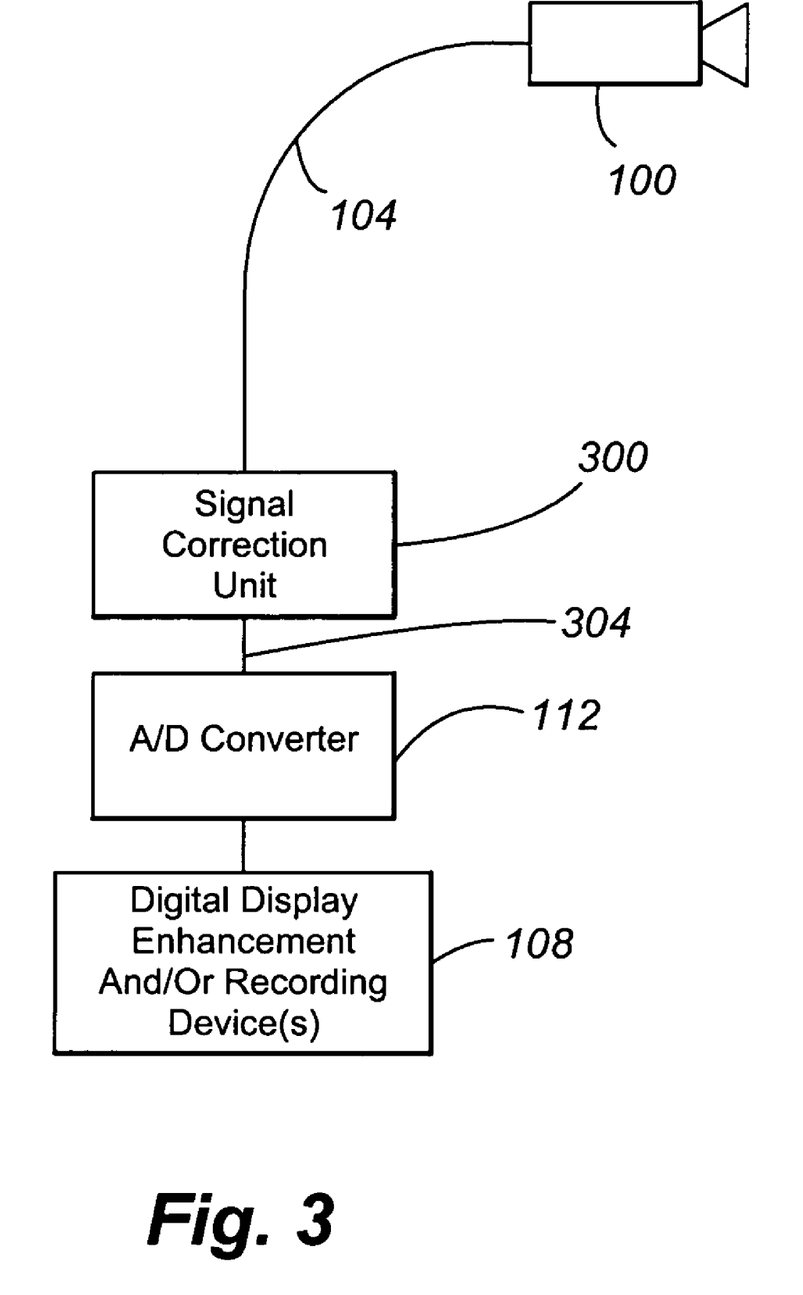
FIG. 3 is a block diagram of a video imaging system according to an embodiment of the present invention.

As depicted in FIG. 3, the video signal correction unit 300 of the present invention is positioned upstream of the A/D converter 112 and digital display enhancement and/or recording device(s) 108 (and in the signal path between the device(s) 108 and the A/D converter 112) to correct for the common causes of composite video signal degradation before the composite video signal is input into the digital display enhancement and/or recording device(s). Preferably, the unit 300 is separate from or integral with the A/D converter. When configured as a separate component, the unit 300 is preferably positioned in close proximity to or adjacent to the converter 112, with a transmission line 304 connecting the signal correction unit 300 to the camera 100 (or composite video source). The distance between the composite video source and the signal correction unit 300 may vary between a few feet to over 1,000 feet, as determined by the user's requirements. Typically, the signal correction unit 300 and the A/D converter 112 are electronically adjacent to one another and even more preferably are mounted in the same equipment rack. More preferably, the cumulative signal loss in the composite video signal along transmission line 304 before being input into the A/D converter and digital display enhancement and/or recording device(s) 108 is no more than about 0.25 dB and even more preferably no more than about 0.1 dB. The signal transmission line may be any conductor, with coaxial or twisted pair being preferred.

Although the preferred embodiment is discussed with reference to NTSC-type analog composite video signals, it is to be understood that the embodiment can operate equally with other types of video signals, such as PAL-type video signals, HDTV component video signals, Red Green Blue or RGB component video signals, Video Graphics Array or VGA-type video signals, and Extended Graphics Array or XGA-type signals over any suitable video interface, including not only composite signals but also Y/C and component video interfaces.

Figure 4:
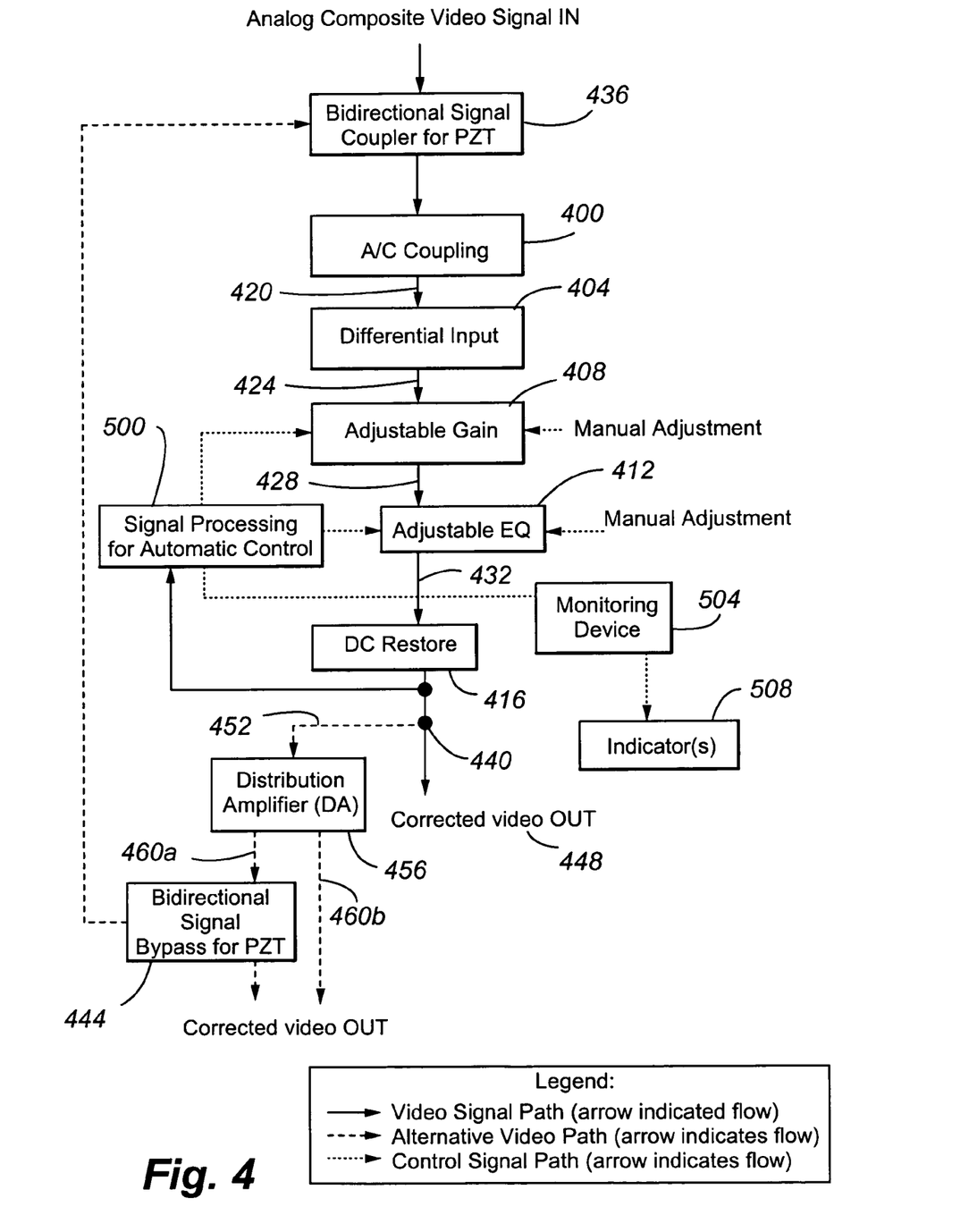
FIG. 4 is a block diagram of a video signal correction unit according to an embodiment the present invention.

The subcomponents of the signal correction unit 300 are depicted in FIG. 4. The unit 300 includes Alternating Current or A/C coupling 400, differential input circuitry 404, adjustable gain circuitry 408, adjustable Equalizer or EQ circuitry 412, and Direct Current or DC restore circuitry 416. The A/C input coupling accepts large DC voltage offsets on the input analog composite video signal to accommodate most installations—even unusual combinations of hardware that result in an unacceptably high magnitude DC voltage component. The differential input circuitry 404 automatically eliminates or minimizes ground loop interference. The (automatically and/or manually) adjustable gain and EQ circuitry 408 and 412 allows for signal optimization, even with significant transmission line loss and/or low signal levels from the video source. The DC restore circuitry 416 automatically provides the correct DC voltage levels on the composite video signal. By positioning the above subcomponents on each of the video channels, the unit 300 can simultaneously process one or more analog composite video signals being conducted or having components being conducted on multiple channels.

As will be appreciated, A/C coupling 400 is implemented by locating capacitive couplers on each video input/channel. Stated another way, in each incoming coax transmission line a capacitive coupler is connected in line with each of the center conductor and shield. Because the capacitors will not pass DC voltage components, such as DC offsets, capacitive coupling will remove from the composite analog signal any DC offset (or fixed reference) on the transmission line 104. In a preferred configuration, A/C coupling removes all of the DC offset in the input composite analog video signal. Any suitable A/C coupling capacitors may be employed.

The differential input 404 results in a high impedance path between the unit's input and output signal ground references. This high impedance path greatly reduces, and most preferably eliminates, undesirable ground loop currents. Specifically, the differential input references the input video signal 420 between the center conductor and shield of the coax cable. The input connector is not grounded, and the input signal is not referenced to the ground. By isolating the input signal shield from the output signal ground, the ground segment of the signal path is broken. The signal input and output impedances are independent of the impedance between the input shield and the output signal ground and are selected to match the impedance of the transmission lines (typically coax cable) 104 and 304 respectively. Preferably, the differential input impedance ranges from about 50 to about 90Ω, with an impedance of about 75Ω being most preferred.

The adjustable gain circuitry 408 allows for adjustment of the video signal amplitude (or IRE levels). The adjustable gain circuitry 408 can be any amplifier that amplifies equally all of the video signal frequency components by a desired gain. This is intended to restore the sync tips 204 to the proper magnitude (or IRE level). Preferably, the signal power is adjusted by an amount ranging from about 0.5× to about 4× (or from about −3 db to about 6 db) and even more preferably from about 0.5× to about 2.5× (or from about −3 db to about 4 db).

The adjustable EQ circuitry 412 allows for frequency-dependant adjustment of the video signal amplitude and is used to compensate for the high-frequency roll-off that is inherent in many types of transmission lines, particularly, but not limited, to coaxial cable and twisted pair. The adjustable EQ 412 may be any amplifier that differentially amplifies only the higher frequency video signal components (e.g., the components have a frequency greater than about 1 MHz). In one configuration, the amount of amplification is frequency independent (or provides fixed or constant gain) for frequencies greater than a selected frequency. In another configuration, the amount of amplification is frequency dependent (or provides variable gain) for frequencies greater than the selected frequency. As will be appreciated, the losses along certain transmission lines, such as a coax, are frequency dependent. For example, 1,000 feet of coaxial cable will provide relatively low losses for 2 MHz signals but much higher losses for 40 MHz signal components. The latter amplifier configuration is intended to provide a frequency dependent gain that matches the signal losses up to about 100 MHz. With reference to NTSC signals, the adjustable EQ 412 is intended to adjust the high frequency components of the video signal to the appropriate magnitude (or IRE level), and the amount of amplification is based, at least in part, on the previously adjusted gain of the adjustable gain circuitry. The adjustable gain is set so that the sync tip 204 is at the correct amplitude. For signal components having a frequency above about 1 MHz, the signal amplification preferably ranges from about 0.5× to about 4× (or from about −3 dB to about 6 dB) and even more preferably from about 0.75× to about 2× (or from about −1.3 dB to about 3 dB).

The differential input 404 and adjustable gain and EQ 408 and 412 may each be any suitable circuitry, such as an integrated circuit. In a preferred implementation, the differential input 404 and adjustable gain and EQ 408 and 412, respectively, are embodied in the EL9110™ integrated circuit manufactured by Intersil Corporation. The integrated circuit is a single channel differential receiver and equalizer. It contains a high speed differential receiver with five programmable poles. The outputs of the pole blocks are summed into an output buffer. The equalization length can be set with the voltage on a single pin. The gain can be adjusted up or down by 6 dB using a $V_{GAIN}$ control signal. Additionally, a further 6 dB of gain can be switched in to provide a matched drive into a cable. The circuit has a bandwidth of about 150 MHz. A single input voltage can be used to set the compensation levels for the required length of transmission line.

Figure 7:
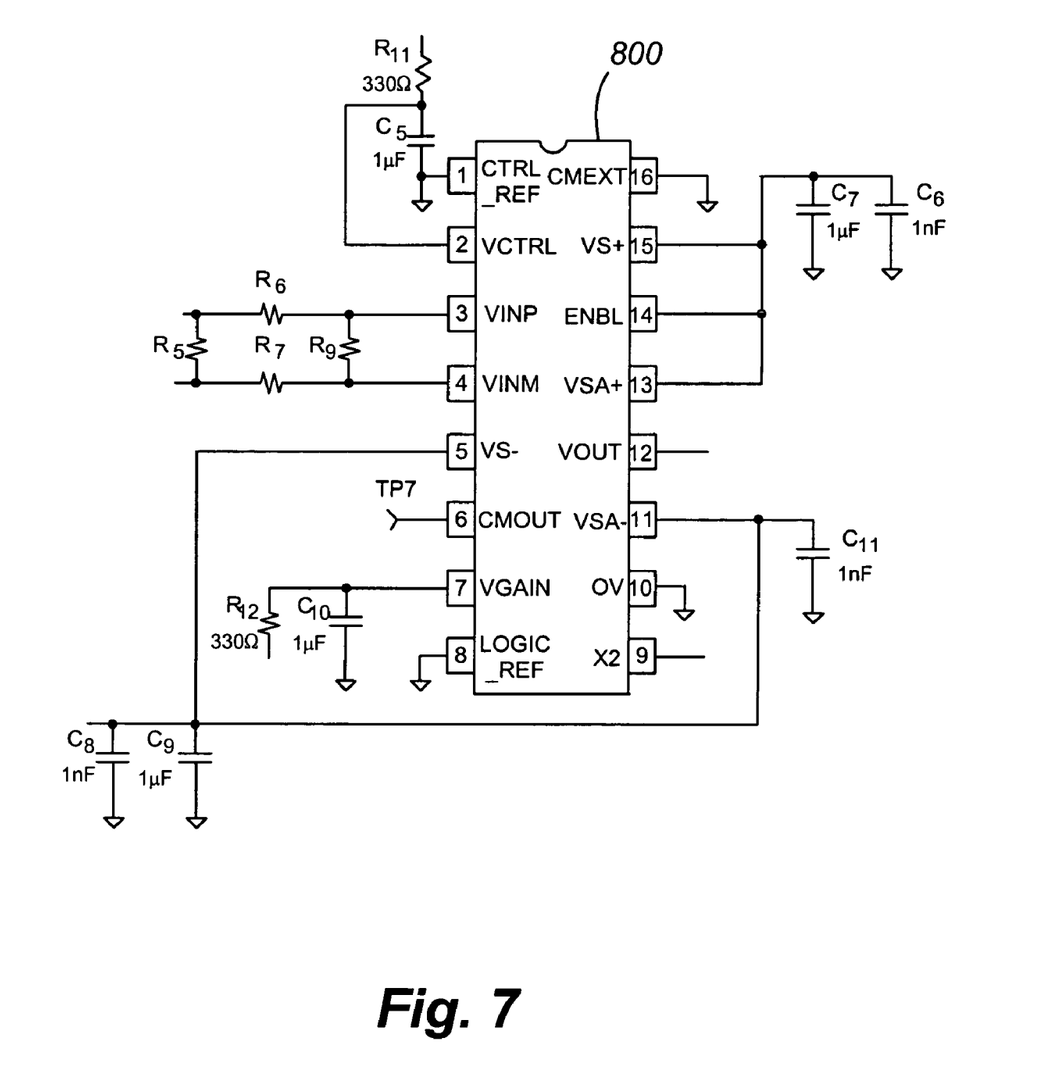
FIG. 7 is a partial circuit diagram of the differential input and adjustable gain and equalizer according to an embodiment of the present invention.
Figure 8:
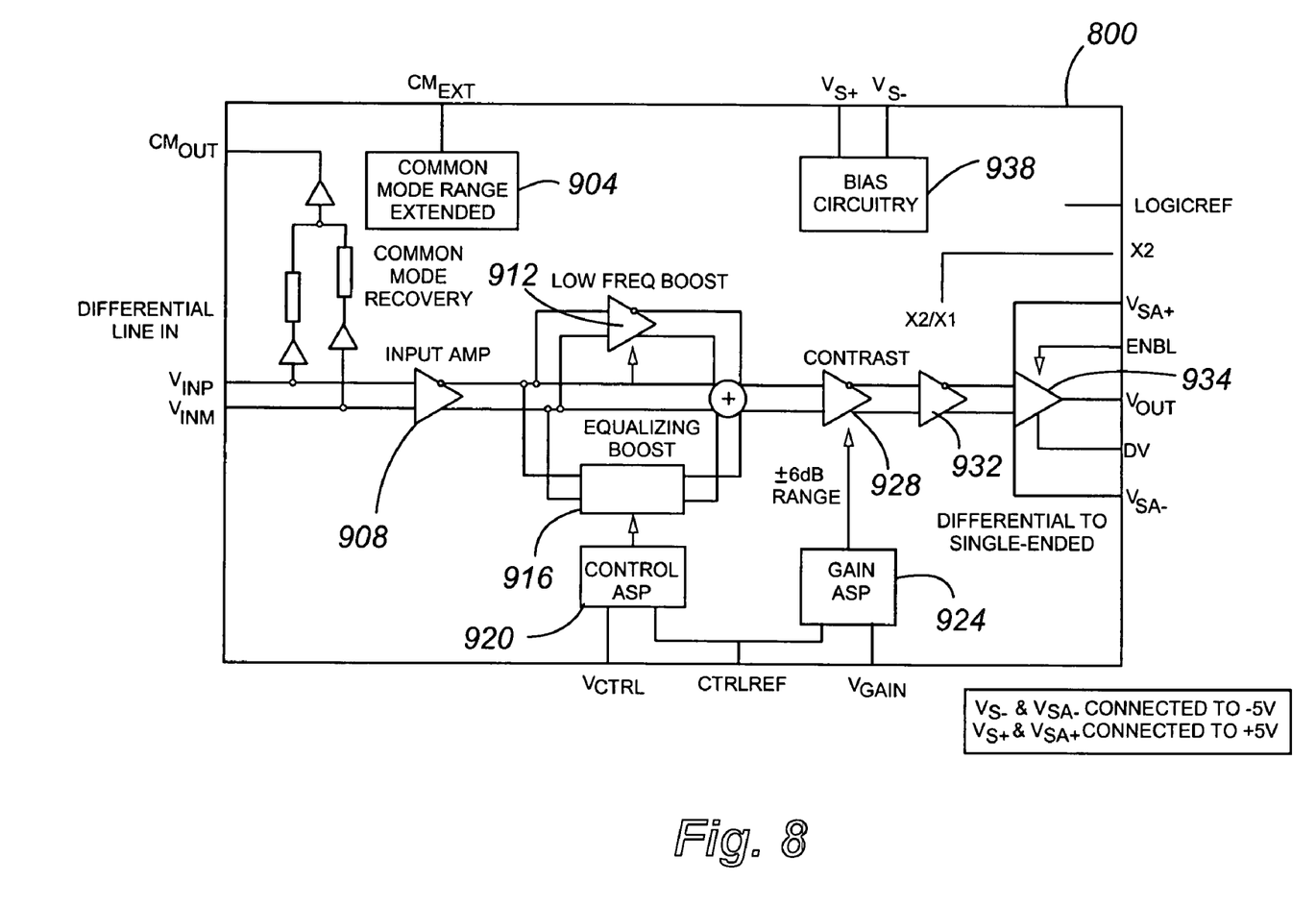
FIG. 8 is a partial circuit diagram of the adjustable gain and equalizer according to an embodiment of the present invention.

The equivalent circuitry of this integrated circuit is shown in FIGS. 7-8. Referring to FIG. 7, the chip 800 is connected to various leads, including CTRL_REF (the reference voltage for the $V_{gain}$ and $V_{CTRL}$ pins), $V_{CTRL}$ (which is the control voltage (0 to 1 Volt) to set equalization), VINP (which is the positive differential input), VINM (which is the negative differential input), VS− (which is −5 Volts to core of the chip 800), CMOUT (which is the output of the common mode voltage present at the inputs), VGAIN (which is the control voltage to set the overall gain (the control voltage is from 0 to 1 Volt)), LOGIC_REF (which is the reference voltage for all logic signals), X2 (which is the logic signal (low−gain=1 and high−gain=2), 0 V (which is 0 Volt reference for the output voltage), VSA− (which is −5 Volts to the output buffer), VOUT (which is the single-ended output voltage referenced to pin 10), VSA+ (which is +5 Volts to the output buffer), ENBL (which is a logic signal to enable the pin where low is disabled and high is enabled), VS+ (which is +5 Volts to the core of the chip 800), and CMEXT (which is the logic signal to enable CM range extension where active is high).

The components of chip 800 are shown in FIG. 8. The chip 800 comprises a common mode range extended module 904, an input amplifier 908, a low frequency boost amplifier 912 and high frequency equalizing boost module 916, a control Analog Signal Processor or ASP 920, a gain ASP 924, and additional amplifiers 928, 932, and 934, and bias circuitry 938. The common-mode extension system is preferably disconnected due to the use of A/C coupling 400.

The DC restore circuitry 416 measures the average DC voltage of the burst interval (or the voltage level of the front porch 200, breezeway 208, and/or back porch 216) as compared to a ground reference and generates a correction voltage to ensure that the blanking portion (or the voltage level of the front porch 200, breezeway 208, and/or back porch 216) of the video signal is at DC ground potential. Preferably, the DC restore circuitry 416 restores the front porch 200 (and the breezeway 208 and back porch 216) (or the 0 volt reference point(s)) to the proper position. When the AC coupling 400 removes any DC offset from the video signal, it effectively removes the DC reference voltage (represented by the front porch 200) from the video signal. DC restore circuitry 416 restores the true zero volt DC reference to the signal. Thus, the presence of the DC restore circuitry 416 is preferred when AC coupling 400 is employed.

Figure 6:
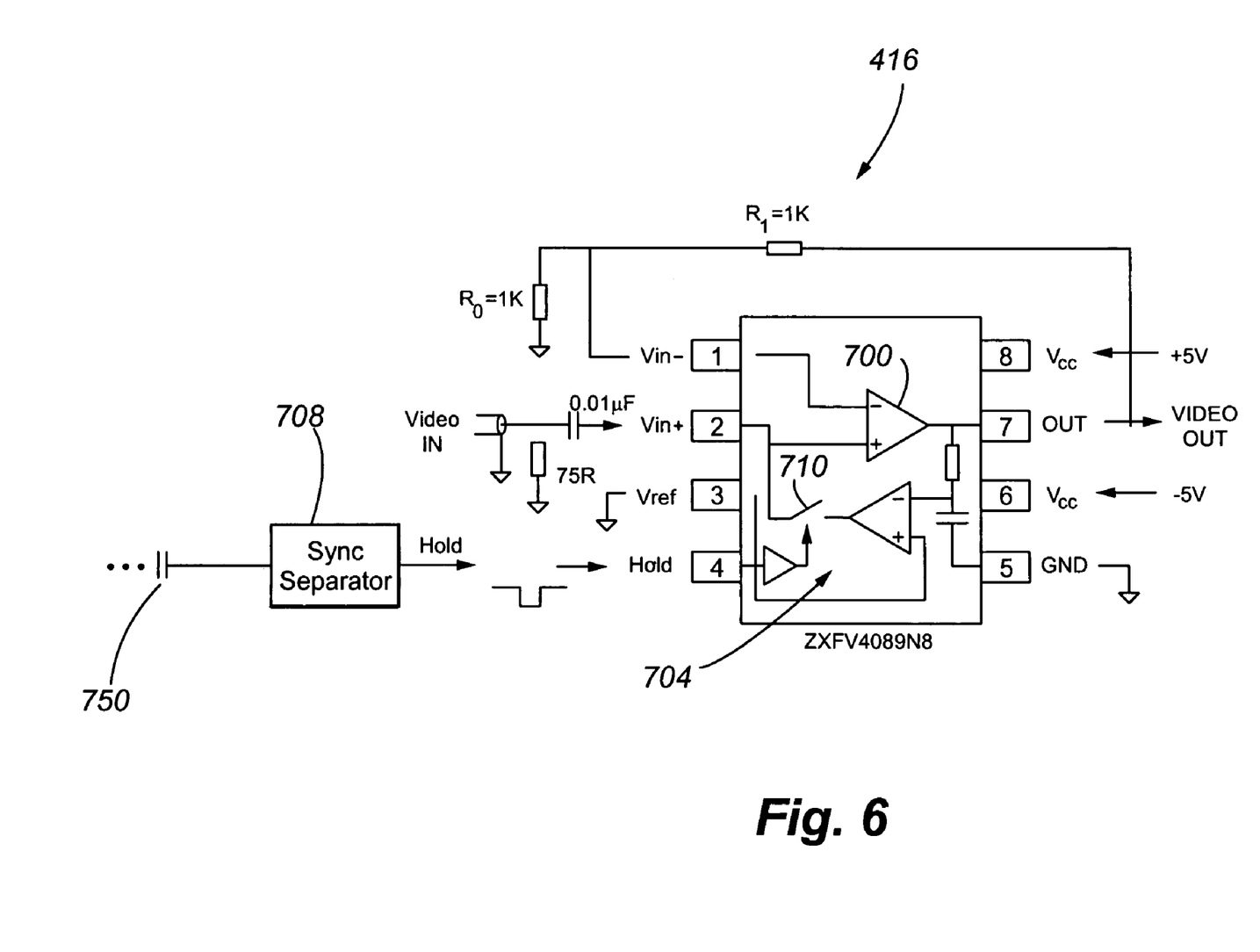
FIG. 6 is a circuit diagram of the DC restore circuitry according to an embodiment of the present invention.

In a preferred configuration shown in FIG. 6, the DC restore circuitry 416 comprises a high fidelity amplifier 700 and a sample-hold switch circuit 704 using an external coupling capacitor to provide level-shifting of the video output signal such that a time-gated sample of the waveform is set to be equal to an external reference voltage (usually 0 Volts). A buffered Transistor Transistor Logic/Complementary Metal Oxide Semiconductor or TTL/CMOS logic input signal controls the switch 710. The gain is set externally by two resistors. The sample-hold circuit may be gated on during part of the front-porch, color burst, and/or back-porch interval of the video signal waveform. The video waveform is then fixed for the remainder of the line-scan interval. In a preferred configuration, the circuit functions by setting, during the horizontal sync, the average DC voltage during the color burst to Vref, which is at pin 3. Setting this to ground (0 Volts) forces the average DC voltage during the color burst (and as a result the back porch 216) to 0 Volts (or 0 IRE) or ground. The hold signal sent to pin 4 goes low during the color burst, and it is during that time that the average DC voltage is forced to ground. Although any DC restore circuitry may be used, the preferred DC restore circuitry is the ZXFV4089™ integrated circuit manufactured by ZETEX.

The sample-hold switch circuit 704 is time gated by a sync separator 708 that is capacitively coupled to the line 432 carrying the amplified and equalized video signal. The sync separator 708 samples the amplified and equalized video signal and generates and sends the timing pulse (or the hold signal) when the sync tip 204 is detected. Although the sync tip may be detected using any voltage level of the sync pulse at or below the 50% level 250 (−20 IRE), the sync tip is preferably detected when the sync pulse voltage hits the 50% level 250 (or −20 IRE). The sync separator 708 sends the hold signal to pin 4. After a predetermined time (or duration of the hold signal), the hold signal goes low as noted above. The predetermined time is measured from the time that the sync tip is detected and is selected so that the hold signal goes low before or during the color burst. The predetermined time is typically about 5.06 microseconds. The capacitor 750 is a DC blocking capacitor (that blocks all of the DC voltages in the video signal) as the sync separator may be damaged by a negative DC voltage. After passing through the capacitor, the signal is suitably adjusted so its voltage does not go negative.

In a preferred implementation, the AC coupling 400, differential input circuitry 404, adjustable gain circuitry 408, adjustable EQ circuitry 412, and DC restore circuitry 416 are located relatively close to one another. Preferably, these circuit elements are electrically adjacent, and even more preferably are integrated onto a single circuit board to minimize signal losses, simplify impedance matching between circuit elements, and minimize undesirable radiation and grounding problems.

As shown in FIG. 4, the input video signal may be preliminarily fed to a bidirectional signal coupler 436, which sends pan, tilt, and zoom (PZT) commands "upstream" from the signal correction unit 300 output 440 to the composite video source 100, typically a video camera. The bidirectional coupler 436 on the signal correction unit 300 output 440 routes the PZT command signals around the various signal processing components 400, 404, 408, 412, and 416 of the signal correction unit 300, to the output bidirectional signal bypass 444 and to the coupler 436. The PZT signal originates from the terminating equipment, typically a DVR or dedicated PZT control device. As will be appreciated, routing the PZT signals through the unit 300 can substantially degrade not only the quality of the processed video signal but also the PZT command signal quality.

Depending on the video system configuration, the output of the DC restore circuitry 416 may either be the signal 448 outputted by the video signal correction unit 300, or may be the signal 452 inputted to a distribution amplifier (DA) 456. The DA 456 generates a multiplicity of nearly identical, and preferably identical, amplified output signals so that the output signal is replicated on a multiplicity of output connectors, enabling the user to send the identical signal to multiple locations or video system components. In one configuration, the amplitudes of the multiple amplified output signals 460a,b are each within about 98% of the amplitude of the input signal 452. Preferably, the distribution amplifier 456 is configured to provide a gain of from about 1.0× to about 1.05× (or of from about 0 dB to about 0.2 dB) with unity gain being most preferred. In a typical implementation, a 1×2 DA is often required so that the signal from the video source can be routed to two different devices, such as a video monitor and a DVR, simultaneously and without any loss of signal.

As shown in FIG. 4, the gain and/or EQ 408 and 412 may be adjusted manually, automatically, or a combination thereof. Automatic adjustment can be effected by monitoring the output of each video channel, and verifying that the vertical interval, synch tip amplitude, and/or color burst amplitude of the output signal meets the desired composite video specification or standard. The automatic control is effected by a signal processing unit 500 coupled with a monitoring device 504 and one or more feedback indicators 508. The unit 500 controls automatically the gain and EQ circuitry using a control feedback loop. The operation of the unit 500 (e.g., the settings of the gain and EQ circuitry, the control signals generated by the unit 500 and the DC restore circuitry 416) is monitored by the device 504, and the device 504 verifies that the post-processed signal meets the desired video standard. The monitoring unit 504 will generate a control signal to the indicator(s) 508, which provides confirmation to the user that the processed signal at the output 440 of the video signal correction unit 300 meets specified parameters/desired standard. The indicator(s) 508 may be visual, such as LEDs or a LCD screen display, or electrical, such as dry contact switch closure, or both and may be a local display, or a device for remote monitoring, or both.

Figure 5:
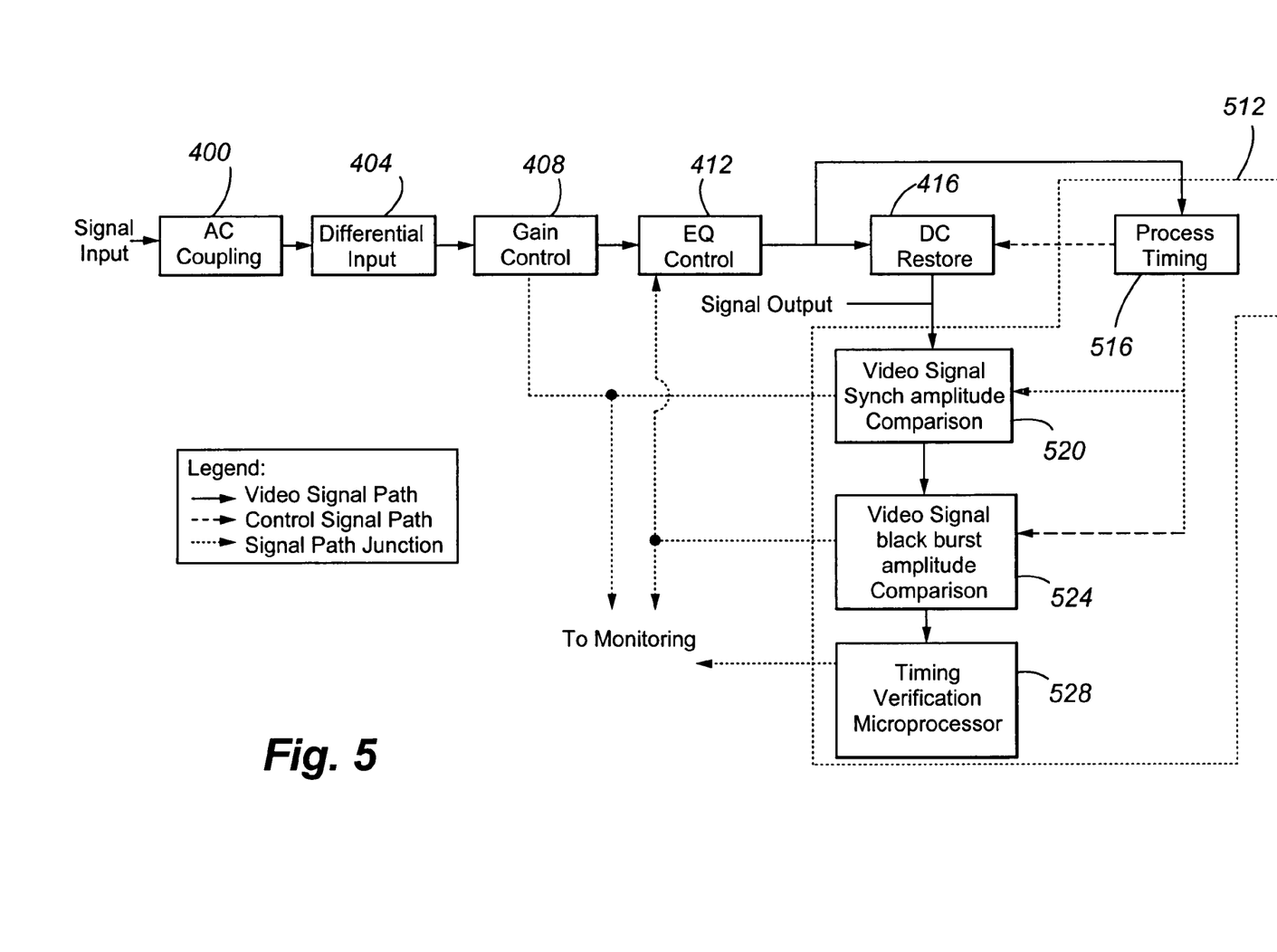
FIG. 5 is a block diagram of a video signal correction unit according to an embodiment of the present invention.

In one configuration, the signal processing unit 500 measures the sync tip voltage level and adjusts the gain, typically with a control voltage, so that the sync tip level meets the signal standard (for example, −40 IRE for an NTSC video signal). The unit 500 also measures the color burst amplitude of the signal level and adjusts the EQ, typically with a control voltage, so that the color burst level meets the signal standard (for example, +/−20 IRE for an NTSC video signal). The signal processing unit 500 determines the gain and EQ correction voltages and may incorporate a microprocessor that measures signal timing and generates one or more control voltages that are sent to the adjustable gain and EQ 408 and 412. The signal processing unit and monitoring device may be, but are not required to be, combined and controlled by a single microprocessor.

FIG. 5 depicts a signal processing unit 500 according to a preferred embodiment of the present invention. The basic elements of the signal processing unit 500 are shown inside the heavy dotted box 512. A process timing signal 516 is extracted prior to the signal output. Note that the location in the video signal flow where this timing signal is extracted is not limited to the position shown. The process timing signal 516 provides needed signal location information to the video signal sync amplitude comparison module 520, the video signal burst amplitude comparison module 524, and the timing verification microprocessor 528.

The video signal sync amplitude comparison module 520 measures the amplitude of the sync pulse 204 and sends a correction signal, if needed, to the gain control circuitry 408 and the monitoring device 504. The video signal burst amplitude comparison module 524 measures the amplitude (or peaks) of the black burst portion of the video signal, and sends a correction signal, if needed, to the EQ control circuitry 412 and the monitoring device 504. The timing verification microprocessor 528 measures the vertical timing intervals and sync tip timing, and compares these measured times to a predetermined time standard. An error signal, that is proportional to the deviation from the desired time standard, is generated and sent to the monitoring device 504.

In any of the above configurations, the unit 300 can include redundant power supply circuitry for increased reliability. This unit may also include a monitoring and control device to switch to or activate the redundant power supply circuitry when the primary power supply means does not meet predetermined performance specifications. Alternatively, the unit may include an uninterruptible power supply (UPS) with alarm means to indicate when the UPS is operating from battery backup.

The above figures are not intended to limit the functions of the signal processing unit to those elements shown, or to indicate that all of these functions are required in every embodiment of the present invention.

A number of variations and modifications of the invention can be used. It would be possible to provide for some features of the invention without providing others.

For example in one alternative embodiment, the various modules or components in the unit 300 are implemented in hardware (such as a logic circuit) and/or in software.

In another alternative embodiment, the signal flow is not restricted to the sequence shown. Other configurations of the same functions are possible, and such variations will be recognized by video equipment design engineers.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A signal processing system, comprising:
   (a) a video input operable to receive at least a first composite analog video signal, the first composite analog video signal comprising a Direct Current or DC voltage offset component, the video input including Analog Circuit or A/C coupling operable to remove at least most of the DC voltage offset component from the first composite video signal to form a DC-adjusted composite analog video signal;
   (b) DC restore circuitry operable to set an average DC voltage of at least a first portion of the DC-adjusted composite analog video signal to a reference voltage, the reference voltage being equal to ground to output a DC-restored composite analog video signal, the DC restore circuitry including a Sync Separator operable to send a hold signal during a color burst portion of the DC-adjusted composite analog video signal, and including said Sync Separator coupled to a buffered logic device operable to set an average voltage during the color burst portion of the DC-adjusted composite analog video signal; and
   (c) an Analog-to-Digital or A/D converter operable to convert the DC-restored composite analog video signal into a composite digital video signal.

2. The system of claim 1, wherein, in the removing step (b), the DC voltage offset component is removed by capacitive coupling.

3. The system of claim 1, wherein the at least a first portion of the DC-adjusted composite analog video signal is the color burst of the video signal.

4. The system of claim 3, wherein the DC restore circuitry comprises an amplifier to amplify the DC-adjusted composite analog video signal, a time-gated sample-hold switch circuit to sample the DC-adjusted composite analog video signal, a switch controller to control the switch setting in the sample-hold switch circuit, and a coupling capacitor to provide level shifting of the DC-restored composite analog video signal, wherein, during a first time interval, the sample-hold circuit samples the DC-adjusted composite analog video signal, wherein the average DC voltage of the sample-hold circuit's sample of the at least a first portion of the DC-adjusted composite analog video signal is set to the reference voltage, and wherein, during a second non-overlapping time interval, the sample-hold circuit is set to hold.

5. The system of claim 1, wherein the DC-adjusted composite analog video signal comprises ground loop interference and further comprising between the video input and DC restore circuitry:
   (d) a differential input to remove at least most of the ground loop interference from the DC-adjusted composite analog video signal.

6. The system of claim 5, further comprising between the differential input and DC restore circuitry:
   (e) adjustable gain circuitry operable to amplify at least a first part of the DC-adjusted composite analog video signal to a selected level, the at least a first part of the DC-adjusted composite analog video signal comprising a sync tip.

7. The system of claim 6, further comprising after the adjustable gain circuitry and before the DC restore circuitry:
   (f) an adjustable equalizer to amplify at least a second part of the DC-adjusted composite analog video signal only at frequencies above a selected frequency.

8. The system of claim 7, wherein the average DC voltage is set during a first time interval and the DC restore circuitry is further operable during a second non-overlapping time interval, to stabilize at least a second portion of the DC-adjusted composite analog video signal, whereby the DC restore circuitry provides a DC-restored composite analog video signal in which the at least a first portion of the DC-restored composite analog video signal is at DC ground potential and at least a second portion of the DC-restored composite analog video signal is not at DC ground potential.

9. A signal processing system, comprising:
   (a) video input means for receiving at least a first composite analog video signal, the first composite analog video signal comprising a Direct Current or DC voltage offset component, and removing at least most of the DC voltage offset component from the video signal to form a DC-adjusted composite analog video signal;
   (b) DC restoring means for setting an average DC voltage of at least a first portion of the DC-adjusted composite analog video signal to a reference voltage, the reference voltage being equal to ground and the at least a first portion comprising at least one of the front porch, breezeway, color burst, and back door to yield a DC-restored composite analog video signal, the DC restore circuitry including a Sync Separator operable to send a hold signal during a color burst portion of the DC-adjusted composite analog video signal, and including said Sync Separator coupled to a buffered logic device operable to set an average voltage during the color burst portion of the DC-adjusted composite analog video signal; and
   (c) an Analog-to-Digital or A/D converter operable to convert the DC-restored composite analog video signal into a composite digital video signal.

10. The system of claim 9, wherein the DC-adjusted composite analog video signal comprises ground loop interference and further comprising between the video input and DC restoring means:
    (d) differential input means for removing at least most of the ground loop interference from the DC-adjusted composite analog video signal.

11. The system of claim 10, further comprising between the differential input and DC restore circuitry:
    (e) adjustable gain means for amplifying at least a first part of the DC-adjusted composite analog video signal to a selected level, the at least a part of the DC-adjusted composite analog video signal comprising the sync tip.

12. The system of claim 11, further comprising after the adjustable gain means and before the DC restoring means:
(f) adjustable equalizer means for amplifying at least a second part of the DC-adjusted composite analog video signal only at frequencies above a selected frequency, wherein the at least a second part comprises the color burst but excludes the sync tip.

13. The system of claim 9, wherein the DC-restoring means stabilizes at least a second portion of the DC-adjusted composite analog video signal, the at least a second portion comprising the sync tip, whereby the DC restoring means provides a DC-restored composite analog video signal in which at least a first portion of the DC-restored composite analog video signal is at DC ground potential and at least a second portion of the DC-restored composite analog video signal is not at DC ground potential.

\* \* \* \* \*

UNITED STATES PATENT AND TRADEMARK OFFICE
CERTIFICATE OF CORRECTION

PATENT NO.       : 7,652,723 B1                                       Page 1 of 1
APPLICATION NO. : 11/082370
DATED            : January 26, 2010
INVENTOR(S)      : Patton et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1290 days.

Signed and Sealed this

Twenty-third Day of November, 2010

David J. Kappos
*Director of the United States Patent and Trademark Office*